Jan. 3, 1933. H. F. KAMPFER 1,893,141
UNIVERSAL LINK
Filed May 9, 1931

Inventor
Herbert F. Kampfer
By
Attorney

Patented Jan. 3, 1933

1,893,141

UNITED STATES PATENT OFFICE

HERBERT F. KAMPFER, OF ST. PAUL, MINNESOTA

UNIVERSAL LINK

Application filed May 9, 1931. Serial No. 536,129.

The present invention relates to a link connection for a chain and to a chain constructed of links embodying the invention.

In certain types of conveyor mechanisms and in various types of chain driving mechanisms, it is desirable to have a chain which is free for universal, pivotal movement at each link connection, and it is also desirable to have a chain which may be readily separated and links removed or added thereto, as required.

An object of the present invention is to make a chain having a plurality of links, adjacent links being connected by pivot means which are insertible in openings in said links and which pivotally connect adjacent links to each other.

These and other features of the invention will be more fully brought out in the following description and the accompanying drawing, wherein.

Figure 2:
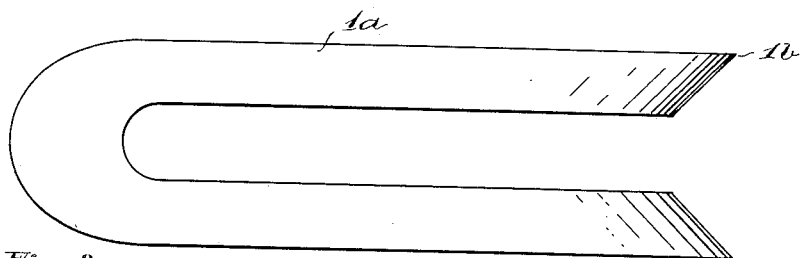
Figure 2 is an enlarged view in side elevation of one of the links shown in Figure 1.

Referring to the drawing in detail, a plurality of links are constructed, each having a pair of similar parallel U-shaped side walls 1 and 1a. The side walls are continuous with each other so that opposite end portions of each link are similar, but disposed in planes perpendicular to each other. Thus, the illustration in Figure 2 could be either a view in side elevation or a top view of a link. The U-shaped end portions of the links may be extended somewhat as at 1—b to fit more closely into the space between the U-shaped ends of the next adjacent link. This feature is particularly desirable when the chain is used as a conveyor chain, so as to form a smoother and more continuous surface on the sides of the chain.

Figure 3:
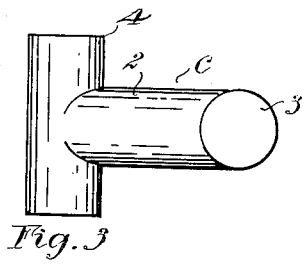
Figure 3 is a view in side elevation on the same scale as the link shown in Figure 2 of a connecting member.

Adjacent links A and B are connected by connecting members C, illustrated in detail in Figure 3. These connecting members C comprise a cylindrical central portion 2 with cylindrical end portions 3 and 4 disposed in planes at right angles to each other and to that of the central portion 2. Any desired number of links may be similarly connected to form a chain of a desired length.

Figure 1:
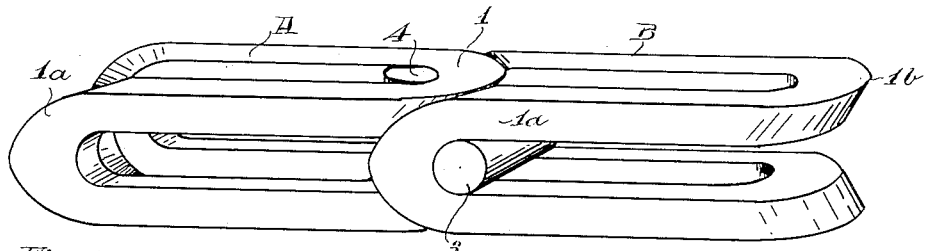
Figure 1 is a view in perspective of a pair of links connected by means embodying the present invention.
Figure 4:
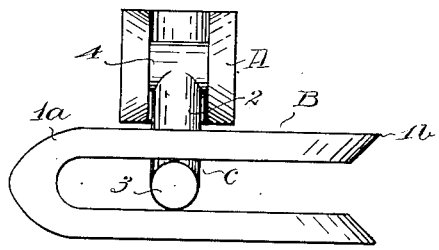
Figure 4 is a view in side elevation in reduced scale of a pair of links swung to the position assumed in the first stage in releasing the connection between links.
Figure 5:
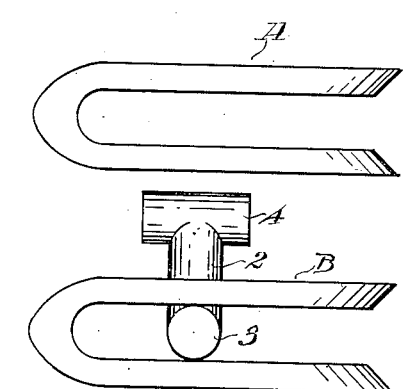
Figure 5 is a view similar to Figure 4 with the upper link turned parallel to the first and removed from engagement with the connecting member.

Assuming that it is desired to disconnect the chain between a pair of adjacent links, as illustrated in Figure 1, the chain is slackened to permit manipulation of the two links to be separated and one of the links is moved pivotally about the end of the other link to which it is connected and simultaneously is pivoted about the central portion 2 of the connecting member to a position at right angles to the link from which it is to be disconnected. This movement brings it to the position shown in Figure 4. The upper link A is then rotated about the axis of the central portion 2 of the connecting member so that the link A lies parallel with, and above the link B from which it is to be disconnected. This brings the transverse end portion 4 of the connecting member in alinement with the opening between the sides of the upper link and the upper link may then be raised to the position shown in Figure 5 to disconnect the links from each other. The connecting member C may then be removed from the lower link by turning the connecting member C so that its lower end portion 3 is parallel with the top opening of the link B and raising it out of engagement with the lower link. To reassemble the links, the process is reversed. Any number of links may be removed or added when the ends of the chain are disconnected in this manner.

It is apparent from the illustration in Figure 1 that the right hand link B may be freely pivoted in a vertical plane about the axis of the end portion 3 of the connecting member C, while the left hand link A may be freely pivoted in a transverse plane about the axis of the end portion 4 of the connecting member C. Each link connection thus forms a universal joint between each adjacent pair of links, so that the chain may be passed over pulleys turning in a plane parallel with each side of the chain.

Chains constructed of this type of links are particularly adapted for conveyor chains, such as are used for the conveying of milk cans, milk bottles, and similar articles. This type of chain is also adapted for use in a flexible drive chain, encased in a flexible tube, as is used in speedometers and similar devices.

When used as a flexible drive chain encased in a tubing as in the case of speedometers and such mechanisms, the edges of the links are preferably rounded. This rounding of the edges is not shown in the illustration of the invention shown, but is familiar to the art, and illustrations of this particular feature are not believed to be necessary.

I claim:

1. In a chain, a link having a pair of U-shaped side portions spaced apart and rigidly interconnected, a connecting member having a transverse end portion adapted to pivotally engage said U-shaped side portions and having a second transverse end portion in a plane at right angles to that of the first end portion, said second transverse end portion being adapted to pivotally engage the U-shaped side portion of a second link similar to the first.

2. In a chain, a link having a pair of substantially U-shaped side portions spaced apart and connected by rounded end portions, a connecting member having a central portion and a pair of transverse end portions, said central member and said transverse end portions being of a width to be insertible between the U-shaped side portions of said link, and said transverse end portion being adapted to be insertible within said U-shaped link side portions to pivot freely therein.

3. In a chain, a link having a slot extending inwardly from an end thereof, and having a second slot extending inwardly from the opposite end of said link at right angles to said first slot, and a connecting member having a portion adapted to be inserted in one of said slots and to engage an end portion of the other of said slots, said member having a portion at right angles to the portion engaging the end of the slot in one of said links and adapted to be inserted in a slot in a second similar link to connect said second link to said first link for universal pivotal movement with respect thereto.

4. In a chain, a link having a pair of perpendicularly disposed slots therein extending inwardly from opposite ends of said link, and a connecting member having a central portion and a pair of perpendicularly disposed, laterally projecting end portions adapted to be mounted in said slots in a pair of adjacent links to connect said links together, with freedom for universal pivotal movement with respect to each other.

5. In a chain, a link having a slot therethrough spaced inwardly from an end thereof, and having a second slot at right angles to said first slot extending inwardly from an end of said link, a connecting member having a central portion and a laterally projecting portion adapted to pivotally engage an end of said first slot with said central portion extending through said second slot, a laterally projecting portion on the opposite end of said connecting member adapted to pivotally engage an end of a slot in a second similar link in a plane at right angles to the pivotal connection of said connecting member with said first link to connect said links together with freedom for universal pivotal movement with respect to each other.

In testimony whereof I affix my signature.

HERBERT F. KAMPFER.